United States Patent [19]

Kinoshita et al.

[11] Patent Number: 5,024,308
[45] Date of Patent: Jun. 18, 1991

[54] ONE-WAY CLUTCH AND HOLDER FOR TORQUE TRANSMITTING MEMBERS THEREOF

[75] Inventors: Yoshio Kinoshita, Ayase; Mitsuharu Nawa, Fujisawa, both of Japan

[73] Assignee: NSK Warner K.K., Tokyo, Japan

[21] Appl. No.: 298,917

[22] Filed: Jan. 19, 1989

[30] Foreign Application Priority Data

Jan. 21, 1988 [JP] Japan .................................. 63-11502

[51] Int. Cl.$^5$ ............................................ F16D 41/07
[52] U.S. Cl. .................................... 192/41 A; 192/45; 192/45.1
[58] Field of Search ..................... 192/41 A, 45, 45.1

[56] References Cited

U.S. PATENT DOCUMENTS

| | | | |
|---|---|---|---|
| 2,832,450 | 4/1958 | Wade | 192/45.1 |
| 2,856,045 | 10/1958 | Ferris | 192/45.1 |
| 2,892,523 | 6/1959 | Zlotek | 192/45.1 |
| 3,718,212 | 2/1973 | Havranek | 192/45 |
| 4,089,395 | 5/1978 | Fogelberg | 192/41 A |
| 4,635,770 | 1/1987 | Shoji et al. | 192/41 A |

FOREIGN PATENT DOCUMENTS

2190440 11/1987 United Kingdom ............. 192/41 A

*Primary Examiner*—Richard Lorence
*Attorney, Agent, or Firm*—Shapiro and Shapiro

[57] ABSTRACT

In a one-way clutch comprising an inner ring and an outer ring, a plurality of torque transmitting members disposed between the rings, and a holder for holding the torque transmitting members, the holder includes an annular body, a first guide arrangement formed on one of axial ends of the body to protrude radially inwardly or radially outwardly from the body and engaged by the outer peripheral surface of the inner ring or the inner peripheral surface of the outer ring, and a second guide arrangement formed on the other axial end of the body to protrude toward the same direction as the first guide arrangement and engaged by the outer peripheral surface of the inner ring or the inner peripheral surface of the outer ring; the body, first guide arrangement and second guide arrangement being made of the same material integrally.

11 Claims, 6 Drawing Sheets

ONE-WAY CLUTCH AND HOLDER FOR TORQUE TRANSMITTING MEMBERS THEREOF

BACKGROUND OF THE INVENTION

1. Field of the Invention

The present invention relates to a one-way clutch used as a part for performing transmission of torque, back stop and the like in a driving apparatus for an automobile, and more particularly, it relates to a holder or retainer for holding torque transmitting elements used in such one-way clutch.

2. Related Background Art

In general, a one-way clutch includes a plurality of torque transmitting elements arranged between an inner ring or race and an outer ring or race, and is so constructed that, only when the inner ring or outer ring is rotated in one direction, torque is transmitted to the outer ring or inner ring, and when the ring is rotated in the other direction the torque is not transmitted. Sprags or rollers are used as the torque transmitting elements, and the rotational force is transmitted or not transmitted through engagement or disengagement between the torque transmitting elements and the rings.

Figure 13:
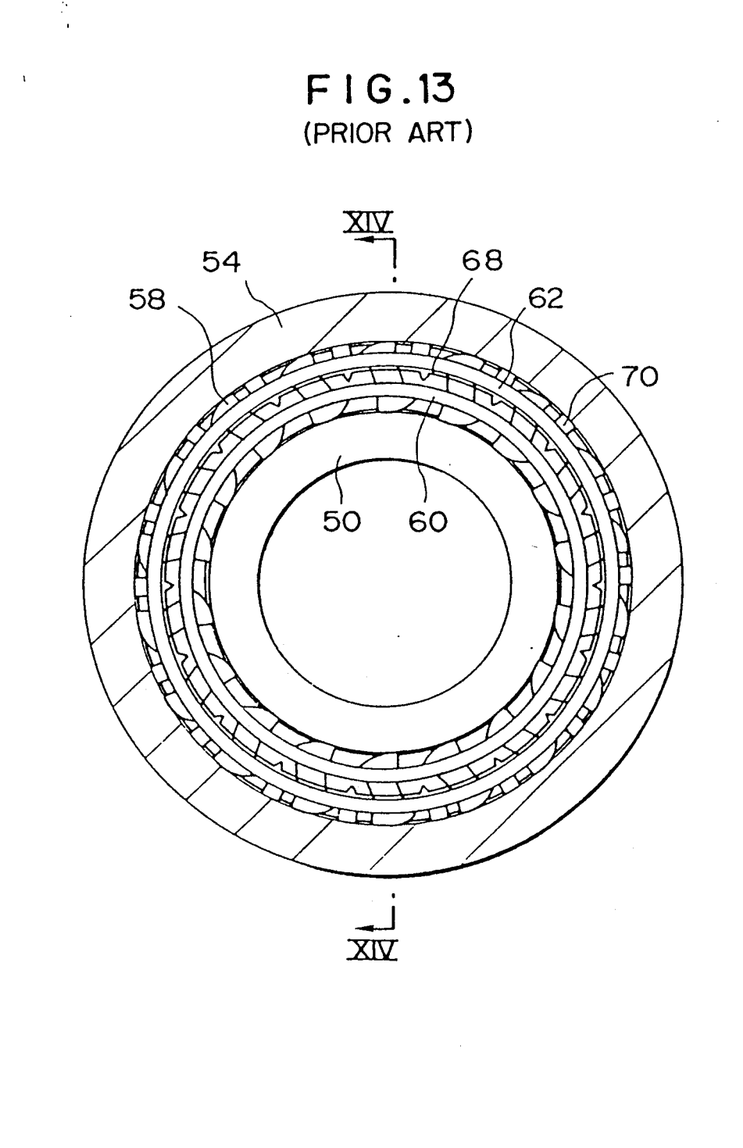
FIG. 13 is a front sectional view showing an example a conventional one-way clutch.
Figure 14:
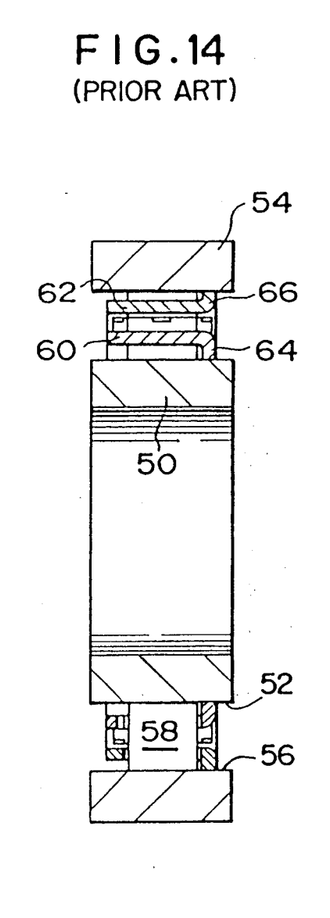
FIG. 14 is s a sectional view taken along the line XIV—XIV of FIG. 13.
Figure 15:
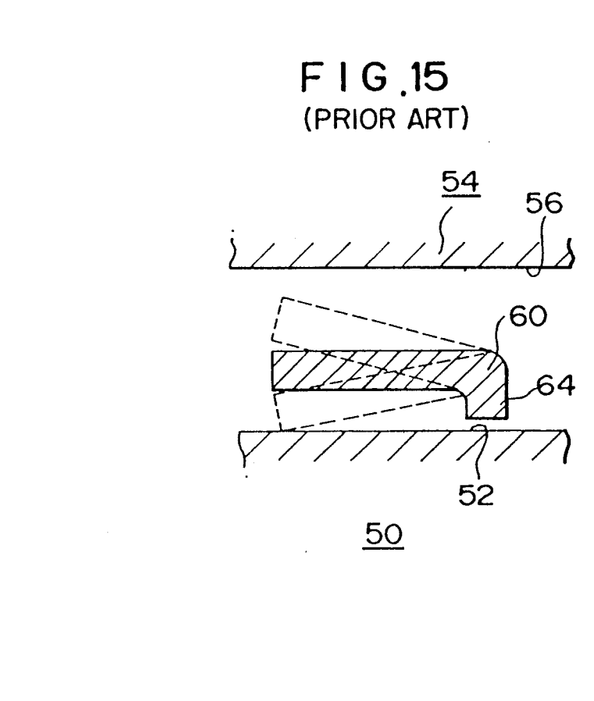
FIG. 15 is an explanatory view for explaining an operation of the conventional one-way clutch.

The sprag-type one-way clutch is, for example, as shown in FIGS. 13 to 15, constituted by an annular inner ring 50 having an outer peripheral surface 52, an annular outer ring 54 arranged coaxially with the inner ring and having an inner peripheral surface 56 opposed to the outer peripheral surface 52, a plurality of sprags 58 arranged in and along an annular space defined between the outer and inner rings at regular intervals in the circumferential direction, and inner and outer holders 60, 62 for holding the sprags in predetermined positions and driving the sprags simultaneously. The sprags 58 are biased by means of a ribbon-shaped spring 68.

The inner holder 60 and outer holder 62 are used for holding or maintaining each of the sprags 58 in the predetermined respective position and for synchronizing the movements of the sprags 58. To this end, the holders 60 and 62 positioned in the annular space between the inner and outer rings must always be kept or maintained in respective given or fixed radial positions. In order to keep each of the holders in the respective given position, the holders are provided at one of their axial ends with flanges 64 and 66, respectively, which are opposed to the outer peripheral surface 52 of the inner ring 50 and the inner peripheral surface 56 of the outer ring 54, respectively, whereby the holders 60 and 62 are guided by the inner ring 50 and outer ring 54, respectively. In this way, the holders 60 and 62 can be rotated in the circumferential direction relatively while keeping their given radial positions, as inner and outer rings 50 and 54 are rotated, thus synchronizing the movements of the sprags 58.

Ideally, the flanges should be formed on both axial ends of each of the holders 60, 62 to guide these. However, it is difficult to manufacture such holder having flanges on its both ends, and thus, the clutch will be expensive. For this reason, in general, the holder having a flange formed on one end has still been widely used in the one-way clutch. However, when the holder having a flange on one end is used in the one-way clutch, there is a risk that a center of the holder will become offset from the centers of the inner ring 50 and the outer ring 54 (i.e., a so-called "bounding phenomenon"), as shown in FIG. 15 in the case of holder 60. If such bounding phenomenon occurs, the sprags and the like will be subjected to abnormal or premature wear, resulting in failure of the one-way clutch.

In addition, when the inner ring 50 or the outer ring 54 is suddenly accelerated or decelerated during rotation, the sprags 58 are slid between the inner peripheral surface 52 and the outer peripheral surface 56 due to inertia, thus wearing down the sprags. In order to prevent such sliding movement of the sprags, a squeezing or dragging torque may be applied between the inner ring 50 or outer ring 54 and the holders 60, 62 to rotate the ring 50 or 54 together with the holders 60 and 62, thereby synchronizing the movement of the sprags 58 with that of the inner ring 50 or outer ring 54. In this case, however, since drag pieces 70 such as drag clips and drag strips must be provided, the number of parts for the clutch is increased and the assembling operation is complicated, thus increasing the cost of manufacture of the clutch. In order to apply the dragging torque, in some cases, in place of the drag pieces, notches have been formed on the holders 60 and 62 to provide I bars or T bars; however, also in this case, there remained the problems in workability and stability of the holders.

As stated above, in the conventional one-way clutch of this kind, it has been economically impractical to keep the holders in the given position by forming the flanges on both axial ends of each holder. Nor has it been feasible as a practical matter to apply the dragging torque to keep the holder in the given position without increasing the number of parts.

SUMMARY OF THE INVENTION

Accordingly, an object of the present invention is to provide a one-way clutch wherein the holders are stably maintained in the given position by guide means on both axial ends of the holders which is easy and inexpensive to manufacture and which does not require an increased number of parts.

Another object of the present invention is to create the dragging torque stably and economically, in the one-way clutch.

The above objects of the invention are achieved by providing curved portions by means of a lancing and bending operation on at least one of the axial ends of each of the holders (on the other axial end curved portions formed by the lancing and bending operation or a flange may be provided) to form or constitute guide means (guide surfaces) for guiding the holders with respect to inner ring or outer ring. Further, the curved portions may have flexibility to permit creation or generation of dragging torque between the holders and the inner or outer ring. In this way, by providing the guide surfaces on both ends of the holders, it is possible to prevent the bounding phenomenon of the holders, thereby holding the holders stably. Further, because the guide surfaces are formed by a lancing and bending operation, the number of parts is not increased, assembling the clutch is easy, and the manufacturing cost is not increased.

In addition, since the dragging torque can be obtained by the flexibility of the curved portions, there is no need for using the drag pieces of the conventional clutch. Therefore, also from this point of view, the holders can be stabilized economically.

BRIEF DESCRIPTION OF THE DARWINGS

DETAILED DESCRIPTION OF THE PREFERRED EMBODIMENTS

The present invention will now be fully explained in connection with embodiments thereof with reference to the accompanying drawings. It should be noted that the present invention is not limited to such embodiments, but can be modified and/or altered appropriately without departure from the spirit of the present invention.

Figure 1A:
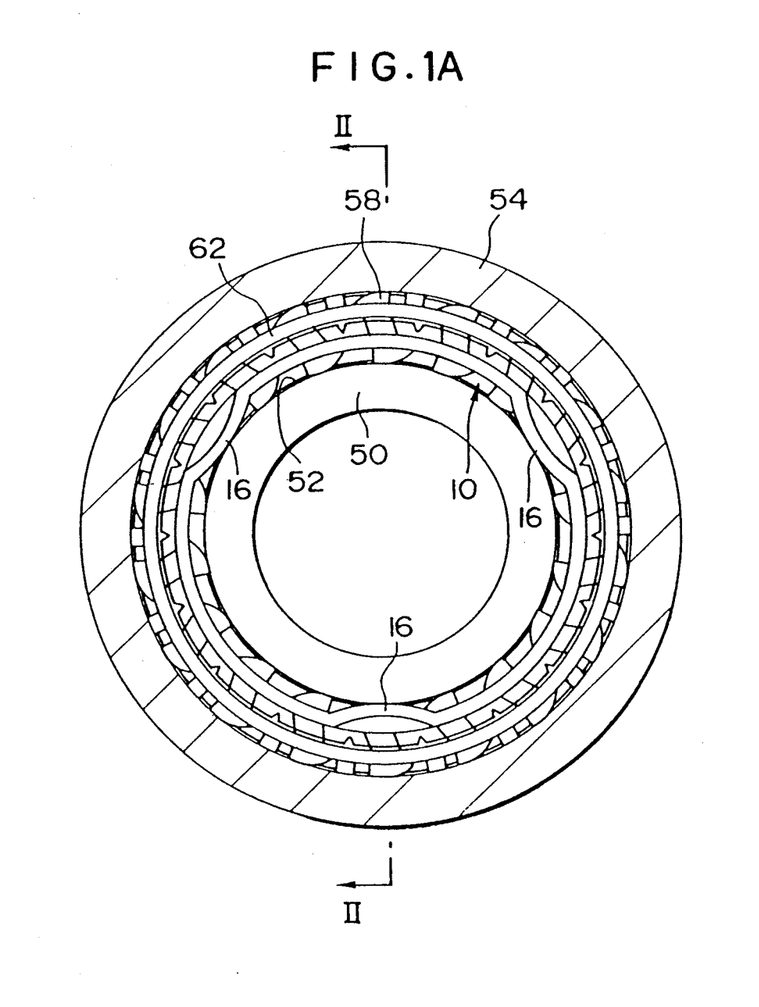
FIG. 1A is a front sectional view of a one-way clutch according to a preferred embodiment of the present invention.
Figure 1B:
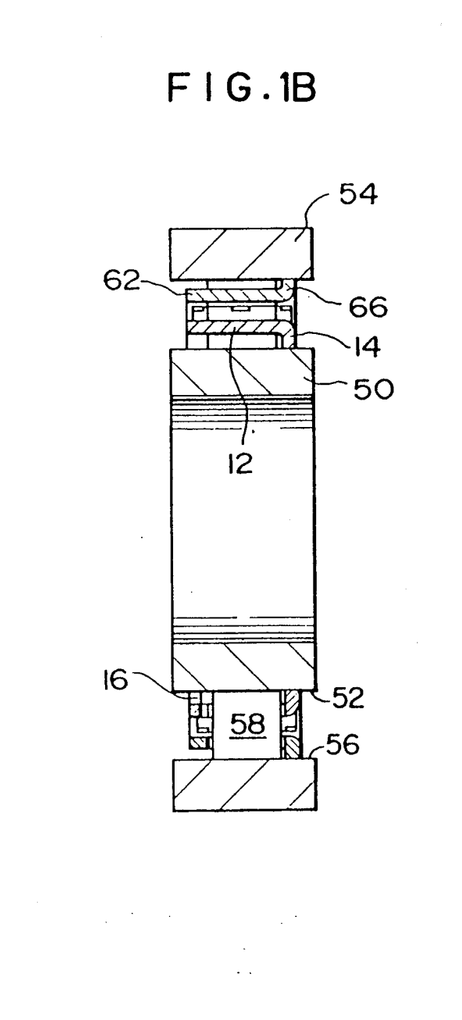
FIG. 1B is a sectional view along the line IB—IB of FIG. 1A.
Figure 2:
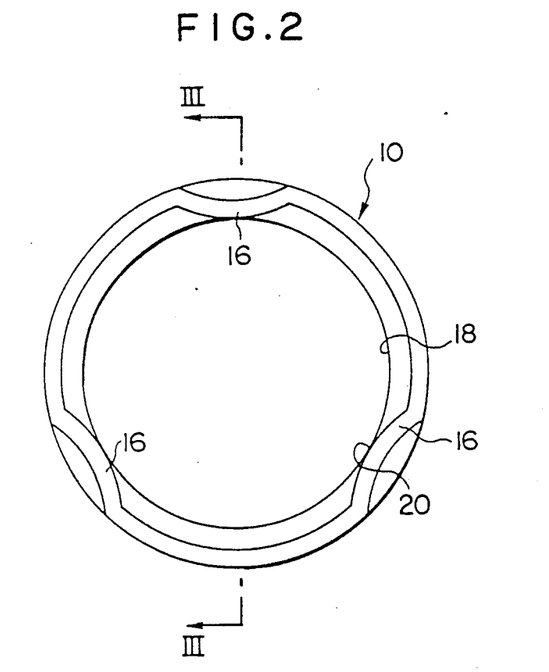
FIG. 2 is a front view of an inner holder used in the one-way clutch of FIG. 1.
Figure 3:
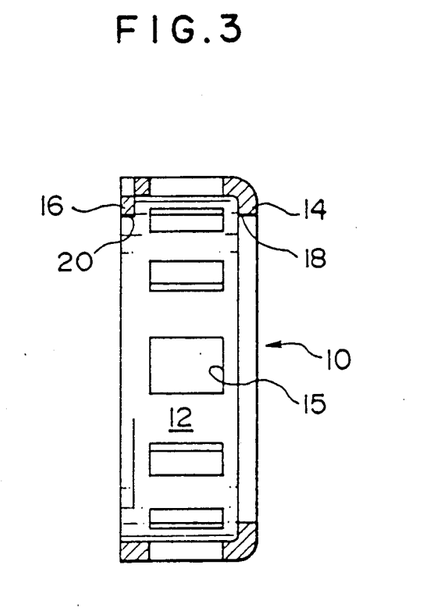
FIG. 3 is a sectional view taken along the line III—III of FIG. 2.
Figure 4:
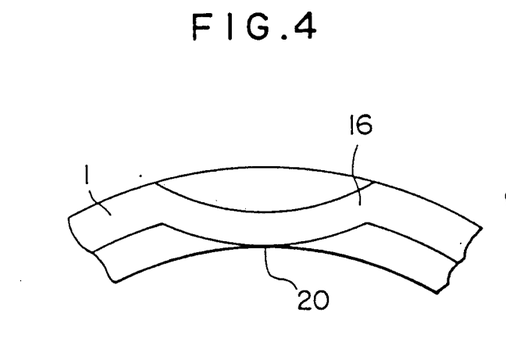
FIG. 4 is an enlarged view showing a portion of the inner holder in detail.
Figure 5:
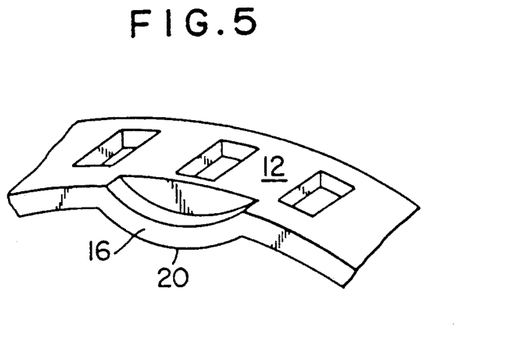
FIG. 5 is a perspective view of the portion of the inner holder.

In the first embodiment of FIGS. 1A and 1B, showing a one-way clutch using two holders (i.e., an inner holder or retainer and an outer holder or retainer), elements corresponding to those shown in FIGS. 13 and 14 are designated by the same reference numerals used in those figures, and detailed explanation thereof is omitted here, since these elements were previously explained in connection with FIGS. 13 and 14. In the form shown, the inner holder 10 has a rectangular cross-section as shown in FIG. 3, and comprises an annular body 12 having openings 15 for receiving the corresponding sprags 58, a flange 14 formed on one of its axial ends and extending radially inwardly, and three bent portions or curved portions 16 formed on its other axial end at positions trisecting the circumference of the body. Each of the curved portions 16 is formed by slitting the predetermined portions of said other end of the body 12 and then by bending or protruding the portions positioned outwardly of the slits radially inwardly with respect to the remaining portion of the annular body 12. The amount of inward protrusion of each of the curved portions 16 is in the same order as the amount of inward protrusion of the flange 14. An inner peripheral surface of the flange 14 and apexes of the curved portions 16 are engaged by the inner peripheral surface 52 of the inner ring 50, thus constituting guide surfaces 18 and 20 for guiding the holder 10, respectively.

In the one-way clutch illustrated here, as is already known, when the inner ring 50 is rotated in a counter-clockwise direction (FIG. 1A), the rotational torque is transmitted to the outer ring 54, but, when the inner ring is rotated in a clockwise direction, the inner ring slips and thus, the torque is not transmitted to the outer ring.

Figure 12:
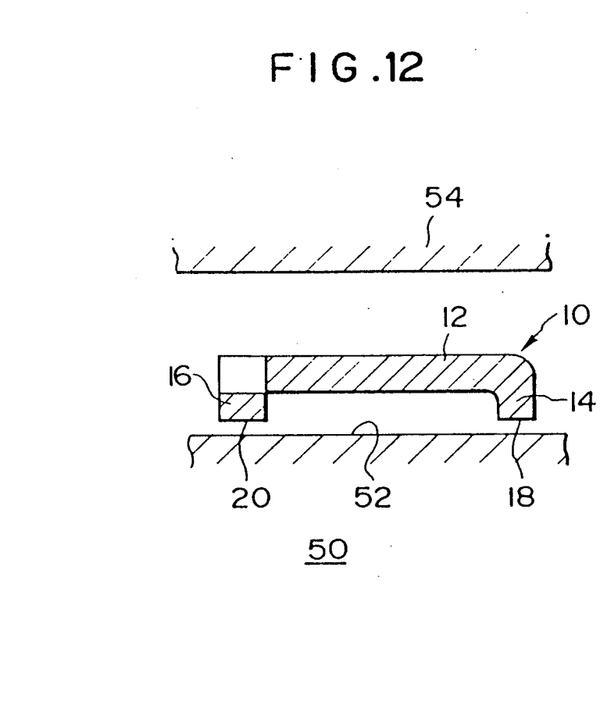
FIG. 12 is an explanatory view for explaining an operation of the embodiment shown in FIGS. 1 to 5.

As will be appreciated with additional reference to FIG. 12, in the one-way clutch having the inner holder 10 constructed as described above, even when the torque is transmitted, the inner holder 10 is always kept in the given position by the guide surface 18 of the flange 14 and the guide surfaces 20 of curved portions 16, whereby the holder 10 is not offset from the inner and outer rings, unlike the conventional holder 60 as shown in FIG. 15.

When each of the curved portions 16 has flexibility, as the holder 10 is inserted onto the inner ring 50, the curved portions are flexed outwardly so that the holder is contacted with the inner ring 50 with a predetermined pressure. In this way, dragging torque is applied to the holder 10 and the sprags 58, thereby reducing the wear of the sprags due to friction and ensuring the connection between the inner ring 50 and the outer ring 54. In this case, the dragging torque must be so selected to have a proper value; however, with the construction above, the value of the dragging torque can be easily adjusted to the proper one by adjusting the flexibility of the curved portions 16.

Figure 6:
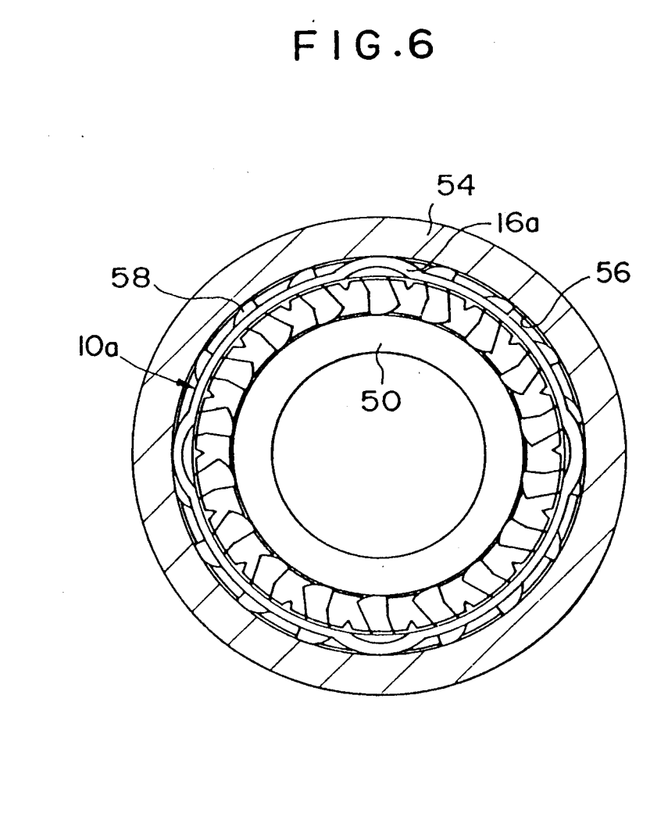
FIG. 6 is a front view of a one-way clutch according to another embodiment of the present invention.

FIG. 6, shows a one-way clutch having a single holder 10a similar to holder 10 but adapted in such a manner that the flange (designated 14a) and the curved portions (designated 16a and numbering four in this case) are engaged by the inner peripheral surface 56 of the outer ring 54.

Figure 7:
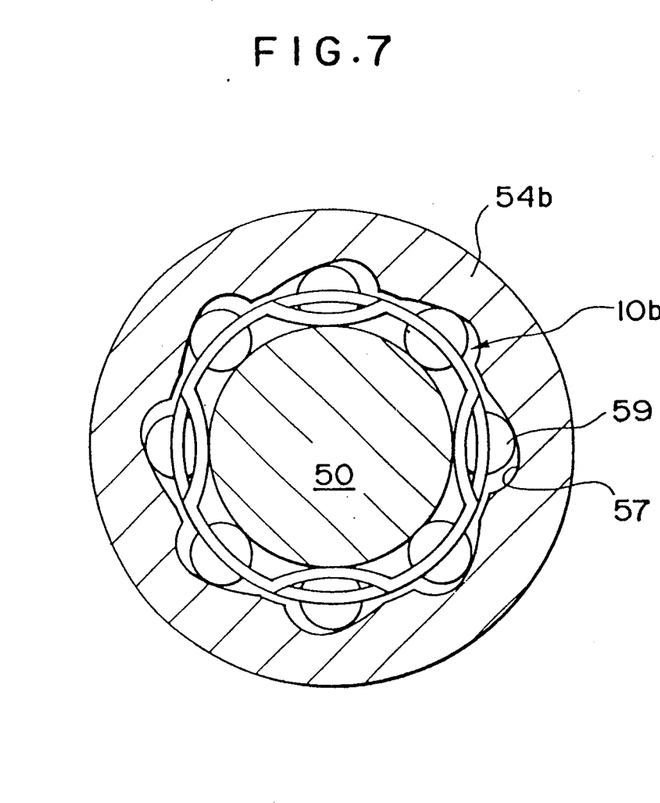
FIG. 7 is a front view of a one-way clutch according to another embodiment of the present invention.

FIG. 7 shows the use of another similar holder 10b in a one-way clutch of the roller-type comprising a plurality of rollers 59 received in corresponding recesses 57 formed in the inner peripheral surface of an outer ring 54b as shown in FIG. 7.

Next, alterations as to the holder will be explained.

Figure 8:
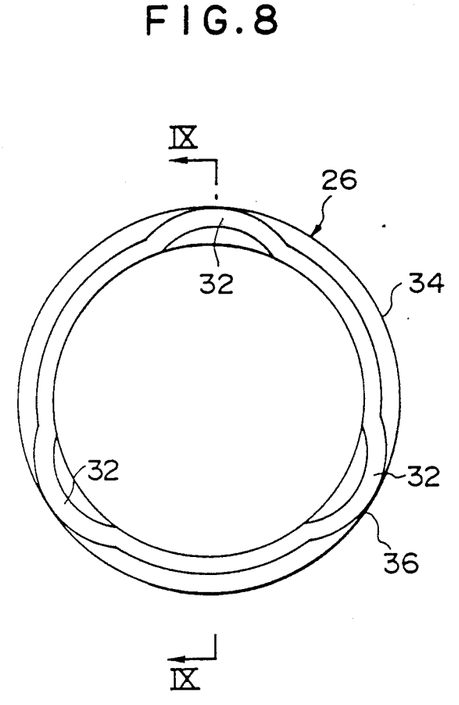
FIG. 8 is a front view of a holder according to another embodiment of the invention.
Figure 9:
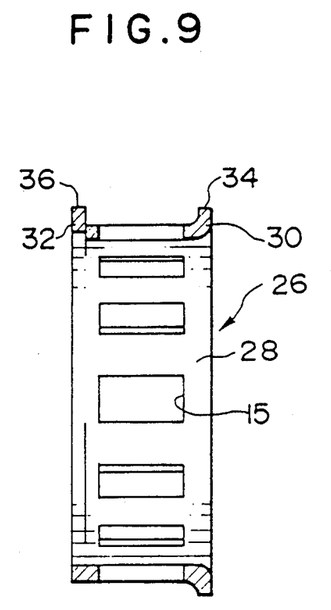
FIG. 9 is a sectional view taken along the line IX—IX of FIG. 8.

In a holder 26 shown in FIGS. 8 and 9, a flange 30 is formed on one of the axial ends of a holder body 28 to extend radially outwardly from the body; whereas, on the other axial end of the body 28, three curved portions 32 are formed by a lancing and bending operation. The flange 30 and curved portions 32 provide guide surfaces 34 and 36, respectively, which are engaged by the inner peripheral surface 56 of the outer ring 54.

Figure 10:
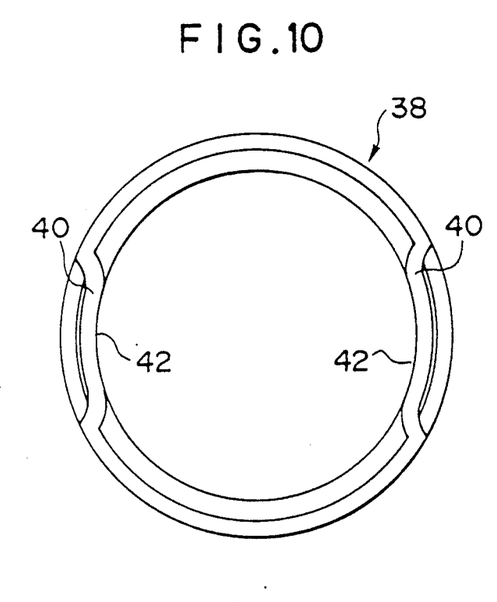
FIGS. 10 and 11 show holders according to further embodiments of the present invention.

In an inner holder 38 shown in FIG. 10, two curved portions 40 which protrude radially inwardly are formed by a lancing and bending operation, and each of guide surfaces 42 of the curved portions is of concave shape in correspondence to the configuration of the outer peripheral surface 52 of the inner ring 50. Further, in an inner holder 44 shown in FIG. 11, four curved portions 46 which protrude radially inwardly are formed by a lancing and bending operation, and apexes 48 of the curved portions constitute guide surfaces which are engaged by the outer peripheral surface 52 of the inner ring 50.

Figure 11:
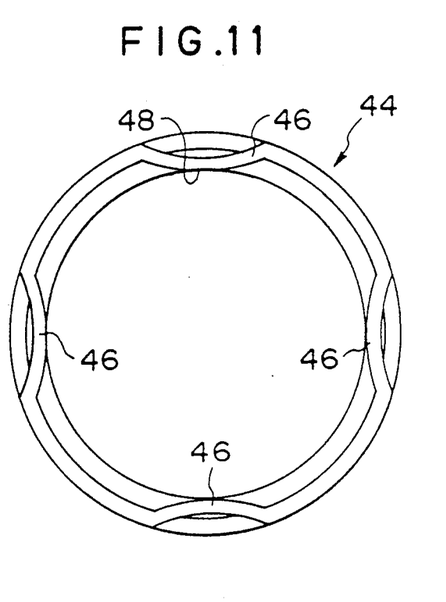

In the holder 38 or 44 shown in FIG. 10 or FIG. 11, the curved portions 40 or 46 may, of course, be modified so that they protrude radially outwardly for use in a single holder one-way clutch as shown in FIG. 6.

In each of the illustrated holders, the curved portions were formed only on one end of the holder by the lancing and bending operation. However, the curved portions may be formed on both ends of the holder by the lancing and bending operation. Of course, in this case, the flanges are omitted.

According to the illustrated embodiments of the invention, since the guide surfaces are provided on both axial ends of the body of the holder, the bounding phenomenon of the holder is effectively prevented, thereby eliminating the slippage and/or wear of the torque transmitting members, thus increasing the efficiency of the one-way clutch. In addition, since the curved portions are formed merely by a lancing and bending operation, the guide surfaces can be formed very easily and economically. Further, since the curved portions may have flexibility to create torque dragging torque between the holders and the inner and outer rings, additional parts for creating the dragging torque are not needed, thus facilitating the assembly of the clutch. Accordingly, according to the present invention, a one-way clutch which has less wear and good reliability and which can withstand vibration and sudden acceleration and/or deceleration can be obtained economically.

What is claimed is:

1. A one-way clutch, comprising an inner race having a cylindrical outer contact surface, an outer race having an inner contact surface and disposed concentrically about said inner race, a plurality of torque transmitting members disposed in an annular space defined by said outer contact surface and said inner contact surface to allow relative rotation between said inner race and said outer race in one direction about a common axis of said inner race and said outer race and to prevent such relative rotation in an opposite direction, and an annular retainer disposed in said annular space for retaining said torque transmitting members in circumferentially spaced positions, said retainer including an annular main body having a plurality of circumferentially spaced holes each receiving a respective torque transmitting member, one axial end portion of said main body having a radially inwardly protruding guide portion contacting said contact surface of said inner race, an opposite axial end portion of said main body having a plurality of circumferentially spaced portions each slit in a circumferential direction of said main body and means including circumferential segments of said opposite end portion adjacent to the slits for guiding said retainer and providing a predetermined drag between said retainer and said contact surface of said inner race, said circumferential segments being bent radially inwardly from said main body into generally arch-like shape as viewed in an axial direction of said main body sufficiently that they engage said contact surface of said inner race resiliently, in an outwardly flexed state, with a predetermined force to effect said guiding of said retainer and to provide said predetermined drag between said retainer and said contact surface of said inner race.

2. A one-way clutch according to claim 1, wherein said guide portion is continuous about the circumference of said one axial end portion of said main body.

3. A one-way clutch, comprising an inner race having a cylindrical outer contact surface, an outer race having a cylindrical inner contact surface and disposed concentrically about said inner race, a plurality of torque transmitting sprags disposed in an annular space defined by said outer contact surface and said inner contact surface to allow relative rotation between said inner race and said outer race in one direction about a common axis of said inner race and said outer race and to prevent such relative rotation in an opposite direction, and an annular retainer disposed in said annular space for retaining said torque transmitting members in circumferentially spaced positions, said retainer including an annular main body having a plurality of circumferentially spaced holes each receiving a respective sprag, one axial end portion of said main body having a radially inwardly protruding guide portion contacting said contact surface of said inner race, an opposite axial end portion of said main body having a plurality of circumferentially spaced portions each slit in a circumferential direction of said main body, with circumferential segments of said opposite end portion adjacent to the slits being bent radially inwardly from said main body into generally arch-like shape as viewed in an axial direction of said main body and resiliently engaging said contact surface of said inner race with a predetermined force for guiding said retainer and providing a predetermined drag between said retainer and said contact surface of said inner race.

4. A one-way clutch, comprising an inner race having an outer contact surface, an outer race having an inner contact surface and disposed concentrically about said inner race, a plurality of torque transmitting members disposed in an annular space defined by said outer contact surface and said inner contact surface to allow relative rotation between said inner race and said outer race in one direction about a common axis of said inner race and said outer race and to prevent such relative rotation in an opposite direction, and an annular retainer disposed in said annular space for retaining said torque transmitting members in circumferentially spaced portions, said retainer including an annular main body having a plurality of circumferentially spaced holes each receiving a respective torque transmitting member, one axial end portion of said main body having a radially inwardly protruding guide portion contacting said contact surface of said inner race, an opposite axial end portion of said main body having a plurality of circumferentially spaced portions each slit in a circumferential direction of said main body, with circumferential segments of said opposite end portion adjacent to the slits being bent radially inwardly from said main body into generally arch-like shape as viewed in an axial direction of said main body and having concave guide surfaces which are complementary to said contact surface of said inner race and which resiliently engage said contact surface of said inner race with a predetermined force for guiding said retainer and providing a predetermined drag between said retainer and said contact surface of said inner race.

5. A one-way clutch, comprising an inner race having an outer contact surface, an outer race having an inner contact surface and disposed concentrically about said inner race, a plurality of torque transmitting members disposed in an annular space defined by said outer contact surface and said inner contact surface to allow relative rotation between said inner race and said outer race in one direction about a common axis of said inner race and said outer race and to prevent such relative rotation in an opposite direction, and an annular retainer disposed in said annular space for retaining said torque transmitting members in circumferentially spaced positions,     said retainer including an annular main body having a plurality of circumferentially spaced holes each receiving a respective torque transmitting member, one axial end portion of said main body having a radially outwardly protruding guide portion contacting said contact surface of said outer race, an opposite axial end portion of said main body having plurality of circumferentially spaced portions each slit in a circumferential direction of said main body, with circumferential segments of said opposite end portion adjacent to the slits being bent radially outwardly from said main body into generally arch-like shape as viewed in an axial direction of said main body and resiliently engaging said contact surface of said outer race with a predetermined force for guiding said retainer and providing a predetermined drag between said retainer and said contact surface of said outer race.

6. A one-way clutch according to claim 5, wherein said guide portion is continuous about the circumference of said one axial end portion of said main body.

7. A one-way clutch according to claim 5, wherein said outer contact surface and said inner contact surface are cylindrical surfaces and said torque transmitting members are sprags.

8. A one-way clutch, comprising an inner race having an outer contact surface, an outer race having an inner contact surface and disposed concentrically about said inner race, a plurality of torque transmitting members disposed in an annular space defined by said outer contact surface and said inner contact surface to allow relative rotation between said inner race and said outer race in one direction about a common axis of said inner race and said outer race and to prevent such rotation in an opposite direction, and inner and outer annular retainers disposed in said annular space for retaining said torque transmitting members in circumferentially spaced positions,     said inner retainer including an annular main body having a plurality of circumferentially spaced holes each receiving a respective torque transmitting member, one axial end portion of said inner retainer having a radially inwardly protruding guide portion contacting said contact surface of said inner race, an opposite axial end portion of said main body having a plurality of circumferentially spaced portions each slit in a circumferential direction of said main body, with circumferential segments of said opposite end portion adjacent to the slits being bent radially inwardly from said main body into generally arch-like shape as viewed in an axial direction of said main body and resiliently engaging said contact surface of said inner race with a predetermined force for guiding said inner retainer and providing a predetermined drag between said inner retainer and said contact surface of said inner race,     said outer retainer including an annular main body with opposite axial end portions, at least one of which end portions has a radially outwardly protruding guide portion engaged with the contact surface of said outer race.

9. A one-way clutch according to claim 8, wherein said guide portion of said inner retainer extends continuously about the circumference of said inner retainer.

10. A one-way clutch according to claim 8, wherein said inner and outer contact surfaces are cylindrical surfaces and said torque transmitting members are sprags.

11. A one-way clutch according to claim 8, wherein said segments have concave guide surfaces complementary to and in contact with said contact surface of said inner race.

* * * * *